Sept. 29, 1964    H. LECROART ET AL    3,151,239
INTERPOLATION DEVICES

Filed May 18, 1961    2 Sheets-Sheet 1

INVENTOR

BY

ATTORNEY

Sept. 29, 1964        H. LECROART ET AL        3,151,239
                    INTERPOLATION DEVICES Filed May 18, 1961                            2 Sheets-Sheet 2

INVENTOR

BY

ATTORNEY

United States Patent Office 3,151,239
Patented Sept. 29, 1964

3,151,239
INTERPOLATION DEVICES
Henri Lecroart, Bourg-la-Reine, and Pierre Ricateau, Garches, France, assignors to Commissariat a l'Energie Atomique, Paris, France, an organization of France
Filed May 18, 1961, Ser. No. 111,097
Claims priority, application France May 24, 1960
3 Claims. (Cl. 235—185)

The present invention relates to devices for the automatic and continuous interpolation between the values of a function of one or two variables, these values being known or measurable for discrete values of these variables.

It happens frequently that a function is known only for discrete values of the variables. This may result either from the nature of the measurement apparatus or from the nature of the phenomenon that is being studied. When, as it also occurs frequently, it is desired to know the value of the function for values of the variables between these discrete values, it is necessary to interpolate. One of the known methods, for this purpose, consists in representing said values of the function by electrical potentials which can easily be measured and in effecting interpolation between these values by means of potentiometers which are connected between points placed at these potentials. When there are many interpolations, this method becomes very tedious.

The interpolation device according to the present invention is characterized in that each of the known values of the function is represented by the alternating component of the electrical potential of a flat conductor element of the shape of a quadrilateral having its sides parallel two by two, these conductor elements, which are all of the same shape and of the same dimensions, disposed adjacent to one another and separated by insulated intervals of small width, constituting a surface covered by a sheet of dielectric material having the same thickness opposite each of these elements, the interpolated value of the function being given by the alternating component of the electric potential of a flat conductor probe movable along this dielectric sheet, and of the same shape and dimensions as said conductor elements, the sides of the probe being constantly kept parallel to those of the conductor elements.

Preferably, the conductor elements are of square shape, which facilitates their arrangement in adjacent relation to one another. But these elements might also, when the function is a function of two variables, be rectangular, or in the form of parallelograms.

The surface formed by the assembly of these elements is preferably a plane.

Generally, the alternating components of the potentials of the elements are all in phase. However the device according to this invention might be used with alternating potentials having different respective phases, either due to the fact that the apparatus for measuring the potential of the probe is responsive only to the component of this potential having a given phase, or because this measurement apparatus permits measurements both in amplitude and in phase. In this last case, a linear vectorial interpolation would be obtained.

A preferred embodiment of our invention will be hereinafter described with reference to the appended drawings given merely by way of example and in which.

Figure 1:
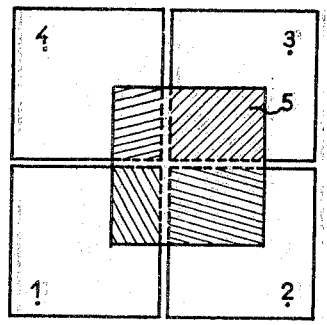
FIG. 1 is a diagrammatical view illustrating the principle of the invention.

The device according to the present invention is based upon the property of flat capacitors with parallel faces of having a capacity proportional to the area of the surfaces located opposite one another.

A square flat conductor surface is divided into four equal square elements 1, 2, 3 and 4 electrically insulated from one another.

A conductor square part 5, called probe, identical to the above mentioned conductor elements, is located above them, at a distance therefrom small with respect to the dimensions of the squares and in such manner that the sides of probe 5 are parallel to the sides of conductor elements 1, 2, 3, 4. Between the opposed surfaces of probe 5 on the one hand and of conductor elements 1, 2, 3, 4 on the other hand, the interposed medium is air or a dielectric material of uniform thickness. Thus four capacitors are formed between probe 5 on the one hand and the four conductor elements 1, 2, 3, 4 on the other hand.

If the thickness of the dielectric sheet is sufficiently small to make it possible to neglect edge effects, the capacity of each of the capacitors is proportional to the area covered by the probe on the corresponding square conductor element.

With respect to a reference potential, each of the four square elements 1, 2, 3, 4 is placed at a given alternating potential, these potentials being of the same frequencies but of different respective amplitudes. These amplitudes will be designated by $V_1$, $V_2$, $V_3$, $V_4$, and the respective areas of the four capacitors will be designated by $S_1$, $S_2$, $S_3$, $S_4$.

Probe 5, the area S of which is equal to $s_1+s_2+s_3+s_4$ is thus placed at a potential V the alternating component of which is the mean of the potentials of the four other capacitor plates respectively multiplied by the useful areas of these capacitors. The amplitude of this potential V will be:

$$V = \frac{V_1 s_1 + V_2 s_2 + V_3 s_3 + V_4 s_4}{S}$$

this formula being applicable in amplitude in the case where the potentials are all in phase and vectorially in the other cases.

If probe 5 is located in coincidence with one of the square elements 1, 2, 3, 4 it is at the potential of this element. If it is between two of these square elements, its potential, intermediate between the respective potentials of these two last mentioned square elements, is the value which would be given by a linear interpolation between the centers of these squares and it depends upon the position of the center of the probe between these two centers. If the probe extends over the four square elements 1, 2, 3, 4, its potential automatically indicates the interpolation between the four values of the two pairs of variables corresponding to these square elements.

The number of square elements such as 1, 2, 3, 4 may be as great as it is desired.

With this device, the value of the function corresponding to any point of the plane of the square conductor elements is given by the potential of probe 5 when the center thereof is located at this point.

Of course, probe 5 is connected with a measurement or detection system which does not modify this potential, the first part of this system being for instance an amplifier having a high input impedance for the frequency that is used.

It may be advantageous to shield the probe electrically against the action of the conductors located in its vicinity thereof.

The device according to this invention thus permits an immediate interpolation between the potentials of four adjacent square elements without requiring any preliminary measurement or any connection of an apparatus to the corresponding conductors; furthermore, it permits of quickly and directly obtaining equipotential curves. Whereas this was impossible with prior systems, it may be combined with an automatic apparatus tracing this equipotential curves in continuous fashion. Such devices have already been used with rheoelectric tanks and can be easily combined with the present invention.

Figure 3:
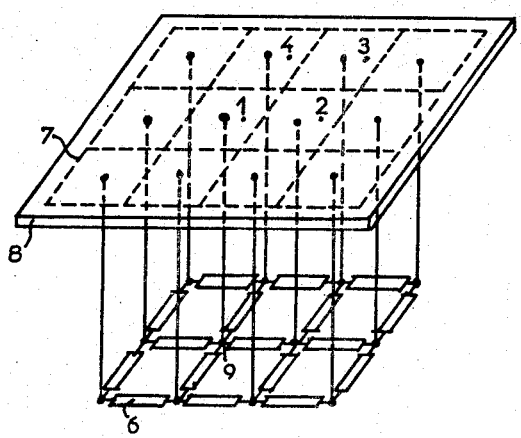
FIG. 3 shows how these elements are connected to a network of resistors.
Figure 2:
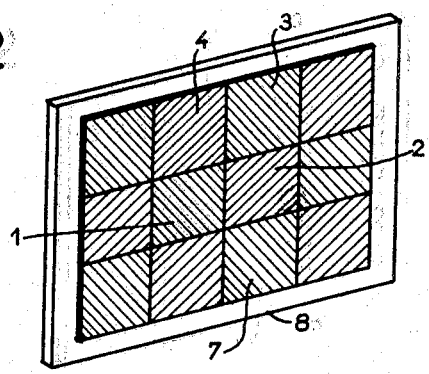
FIG. 2 shows the conductor elements and the dielectric sheet of a device according to the invention.
Figure 4:
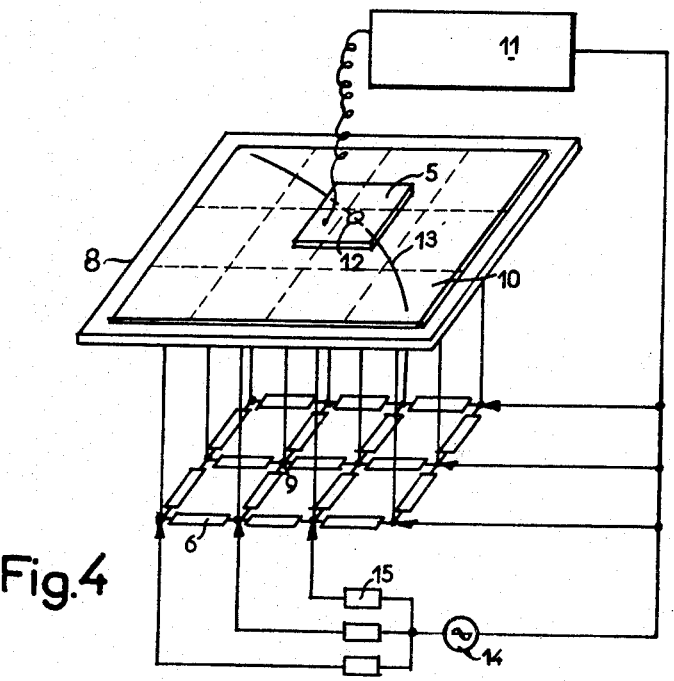
FIG. 4 is a diagrammatical view of the device according to this invention.

FIGS. 2 to 4 relate to an interpolation device for use with analog calculation tables and more especially with two-dimensional resistor networks. It is known that such networks are used for calculation of functions of two variables. Such a network consists of a kind of grid formed by resistors extending in two directions transverse to each other, as shown at 6 (FIG. 3) and connected together at junction points such as 9.

It is the potential at each of the junction points of such a network that indicates the value of the function for the two values of the variables corresponding to the coordinates of this junction point. Therefore, the value of the function is known only for each of the pairs of discrete values of the variables corresponding to one of these points. When it is desired to know the value of the function for other values of the variables, in particular to trace the equipotential lines of this network, an interpolation becomes necessary. Up to this time, this interpolation was generally made by means of potentiometers connected between adjacent junction points. The interpolation for a point located on a straight line extending between two consecutive junction points can easily be obtained by means of a single potentiometer inserted between these two junction points. The slider of the potentiometer is placed at this intermediate point and the potential that is obtained indicates the value of the function at this point.

When it is desired to obtain a value of the function for values of the variables corresponding to points located between the junction point of the network, it becomes necessary to make use of three potentiometers. For instance if A, B, C, D, are junction points located at the appexes of a square, A and B corresponding to the same value $x_1$ of the first variable and C and D to another value $x_2$ of this first variable, whereas A and C correspond to the same value $y_1$ of the second variable, and B and D to another value $y_2$ of this second variable, it is desired to know the value of the function for a value $x$ of the first variable located between $x_1$ and $x_2$ and a value $y$ of the second variable located between $y_1$ and $y_2$. For this purpose, a first potentiometer is inserted between A and B and a second one between C and D, the slider of these two potentiometers being both brought to a position corresponding to the value $y$ of the second variable. The third potentiometer is inserted between the sliders of the two first mentioned potentiometers, the position of the slider of the third potentiometer being that corresponding to the value $x$ of the first variable. The value of the function is indicated by the potential on this last mentioned slider.

We thus obtain an interpolation between four junction points that is relatively accurate but very long and difficult to obtain.

In particular, when it is desired to trace equipotential curves, it is necessary, whenever the desired potential value has been obtained, to plot upon a diagram the values of the variables corresponding to the positions of the sliders.

FIG. 3 shows a network of resistors made of elements such as 6 having values ranging from 100 to 5000 ohms, this network being fed from an alternating current source not visible on the drawing and of a frequency of 400 Hz.

According to this invention, a sheet of a conductor material 7 is fixed on a sheet 8 of an insulating material, thin, rigid and of constant thickness (see FIG. 2) and sheet 7 is divided into square elements such as 1, 2, 3, 4, each of them being insulated from the other by narrow and regular lines. A suitably treated sheet for printed circuits may be used for this purpose. The insulating plate 8 is 1 mm. thick. The sides of squares 1, 2, 3, 4, are 20 mm. long, the insulating lines separating these square elements, obtained by engraving, having a width of 0.2 mm.

Every element such as 1 is electrically connected with a corresponding junction point such as 9 of the network (see FIG. 3).

FIG. 4 shown a sheet of paper 10 applied on insulating plate 8. The probe 5, in the form of a square the edges of which are 20 mm. long, is placed on paper sheet 10 and a mechanical device (not shown) including deformable parallelograms and similar to those used for drafting tables, serves to move this probe 5 so that its sides remain constantly parallel to the separating lines between square elements such as 1, 2, 3, 4. The presence of this probe does not modify the potential of the junction points of the network because the maximum capacity of this probe with respect to an element such as 1 (20 picofarads) always has, at a frequency of 400 Hz., a very high impedance in view of the resistor of highest resistance (5000 ohms) of the network, and the amplifier to which the probe is connected has an input impedance of the same order of magnitude as this impedance. This amplifier belongs to a measurement system 11 which permits of detecting, when probe 5 is displaced, the position for which this probe is at the chosen potential. Furthermore, probe 5 is provided at its center with a hole 12, of a diameter equal to 0.8 mm., to permit of plotting on the paper by means of a pencil (not shown) or the like, the position of the probe.

It is thus possible, every time the potential of probe 5 is equal to the chosen value, to mark on a sheet of paper a point of the corresponding equipotential curve. To trace this curve, it suffices to trace a line 13 passing through the plotted points. With an accurate measurement apparatus, the tracing may be practically continuous.

Electro mechanical control device of a known type may effect this tracing automatically, the error signal being the difference between the potential measured by a measurement system 11 and the chosen value of the potential.

FIG. 4 also shows the alternating current generator 14 connected to several junction points of the network through supplementary resistors such as 15. The choice of these connections depends of course upon the limit conditions for the function that is calculated.

In a general manner, while we have, in the above description, disclosed what we deem to be a practical and efficient embodiment of our invention, it should be well understood that we do not wish to be limited thereto as there might be changes made in the arrangement, disposition and form of the parts without departing from the principle of the present invention as comprehended within the scope of the accompanying claims.

What we claim is:

1. An interpolation device for measuring the value of a function of at most two variables for values of at least one variable intermediate between a plurality of known values of said function corresponding to discrete values of said variable, this device comprising, in combination, a plurality of flat conductor elements, all of the same shape and size, located in a common surface, and electrically insulated from one another, each of said conductors having four sides, the respective two sides opposite to each other being parallel, these conductor elements closely adjoining one another, means for transmitting to each of said elements an alternating electric potential proportional to the known value of said function for one of said discrete variable values respectively, a sheet of dielectric material of uniform thickness extending over the surface formed by said plurality of elements, a flat conductor probe, of a shape and size identical to those of said conductor elements, located on the other side of said dielectric sheet from said surface, said probe being movable in all directions on said dielectric sheet, with the sides of said probe constantly parallel to the corresponding sides of said conductor elements respectively, and means for measuring the electric potential of said probe.

2. An interpolation device for measuring the values of a function of two variables for values of said variables intermediate between a plurality of known values of said function corresponding to discrete values of said variable, this device comprising in combination a plurality of flat square conductor elements all of the same size located in a common surface and electrically insulated from one another, these conductor elements closely adjoining one another, means for transmitting to each of said elements an alternating electric potential proportional to the known value of said function for one pair of said discrete variable values respectively, a sheet of dielectric material of uniform thickness extending over the surface formed by said plurality of elements, a flat square conductor probe of the same size as said conductor elements located on the other side of said dielectric sheet from said surface, said probe being movable in all directions on said dielectric sheet with its sides constantly parallel to the corresponding sides of said conductor elements respectively and means for measuring the electric potential of said probe.

3. A device according to claim 2 in which said surface is a plane.

References Cited in the file of this patent

UNITED STATES PATENTS

| | | |
|---|---|---|
| 893,811 | Pickard | July 21, 1908 |
| 2,678,435 | Vaughan | May 11, 1954 |